United States Patent [19]

Derby et al.

[11] Patent Number: 5,727,190
[45] Date of Patent: Mar. 10, 1998

[54] METHOD AND SYSTEM FOR THE ACCELERATION OF GRAPHICS IMAGES IN A MULTIPROCESSOR OR PREEMPTIVE PROCESSING COMPUTER SYSTEM

[75] Inventors: Herbert G. Derby, Pittsburgh, Pa.; Thomas E. Dowdy, Sunnyvale, Calif.

[73] Assignee: Apple Computer, Inc., Cupertino, Calif.

[21] Appl. No.: 537,386

[22] Filed: Oct. 2, 1995

[51] Int. Cl.⁶ .................................................. G06F 15/16
[52] U.S. Cl. .......................... 395/503; 395/515; 345/200
[58] Field of Search ........................... 395/503, 515, 395/516, 520, 521, 412, 421.1, 421.11; 345/190, 200, 203; 382/232, 237, 241, 242, 243, 245, 305

[56] References Cited

U.S. PATENT DOCUMENTS

| | | | |
|---|---|---|---|
| 5,127,098 | 6/1992 | Rosenthal et al. | 395/412 |
| 5,249,264 | 9/1993 | Matsumoto | 395/134 |
| 5,307,449 | 4/1994 | Kelley et al. | 395/119 |
| 5,623,692 | 4/1997 | Priem et al. | 395/823 |

*Primary Examiner*—Mark R. Powell
*Assistant Examiner*—U. Chauhan
*Attorney, Agent, or Firm*—Sawyer & Associates

[57] ABSTRACT

A method and system for accelerating graphics images in a computer system comprises encoding a first value information into an address signal from a CPU within the computer system and then encoding a second value information into the data signal from the CPU within the computer system. By encoding the information in this manner the location of the graphics data is unimportant. Hence, an address space of the memory can be utilized as the accelerator. In one aspect of the present invention, a span of a particular scan-line can be encoded in the address signal and the row and color information of the scan-line can be encoded in the data signal. In another embodiment, the span of a particular scan-line can be encoded in the address signal and the row, color information and intensity value information can be encoded into the data signal. The method and system uses to advantage that the main memory of the computer system has a large area which can be configured as an addressable space when rendering graphic images. Accordingly, graphics images can be rendered more quickly with minimal additional software and hardware overhead.

38 Claims, 5 Drawing Sheets

METHOD AND SYSTEM FOR THE ACCELERATION OF GRAPHICS IMAGES IN A MULTIPROCESSOR OR PREEMPTIVE PROCESSING COMPUTER SYSTEM

FIELD OF THE INVENTION

The present invention relates to multiprocessor or preemptive processing computer systems, and more particularly to acceleration of graphics in such a multiprocessor or preemptive processing system.

BACKGROUND OF THE INVENTION

In a multiprocessor computer system, users often run multiple programs or processes at the same time. Typically an accelerator is utilized to move the graphics more quickly to the display via a frame buffer. The users can then usually switch from one process to another, such as switching from a graphics drawing program to a word processing program to a spreadsheet program on a routine basis. In a computer environment especially, multiple processes each typically occupy separate, multiple windows, so that switching among programs merely involves switching from one window to another.

In some systems, a preemptive approach is used to allow one program to interrupt and halt the use of the display screen by another program. In these preemptive systems, arbitration of the control of the display screen is a significant concern. Particularly in a multiprocessing environment, arbitration becomes a very expensive portion of the graphics rendering. In typical systems, the costs of arbitration when utilizing a conventional approach for acceleration, is at its maximum price. This is because in a multiprocessing environment, the number of state necessary to arbitrate the different processes is large because of the computing speeds of the multiprocessing system. As a result, conventional accelerators are at their maximum size.

Accordingly, what is needed therefore is a method and system to allow for acceleration of data to a display while reducing the complexity associated with conventional accelerator systems. This system should be one that doesn't require additional hardware and also includes existing software overhead. The present invention provides such a method and system.

SUMMARY OF THE INVENTION

A method and system for accelerating graphics images in a computer system is disclosed. The method and system comprises encoding a first value information into an address signal from a CPU within the computer system; and then encoding a second value information into the data signal from the CPU within the computer system.

By encoding the information in this manner the location of the graphics data is unimportant. Hence, an address space of the memory can be utilized as the accelerator. In one aspect of the present invention, a span of a particular scan-line line can be encoded in the address signal and the row and color information of the scan-line can be encoded in the data signal.

In another embodiment, the span of a particular scan-line can be encoded in the address signal and the row, color information and intensity value information can be encoded into the data signal.

The method and system in accordance with the present invention uses to advantage that the main memory of the computer system has a large area which can be configured as an addressable space when rendering graphic images. Accordingly, graphics images can be rendered more quickly with minimal additional software and hardware overhead.

DETAILED DESCRIPTION

The present invention relates to the acceleration of images on a display screen by multiple processes or multiple processors. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
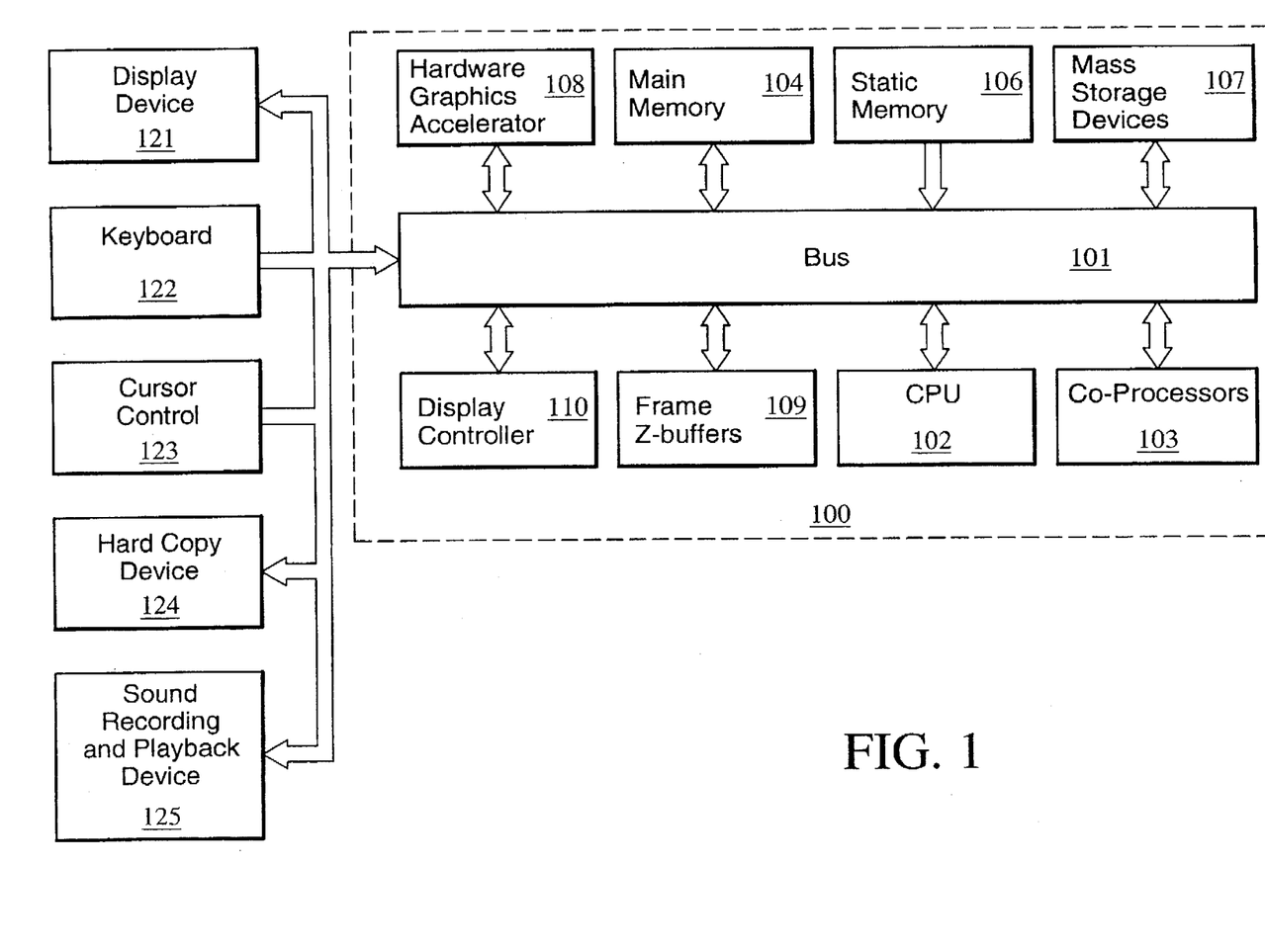
FIG. 1 illustrates a block diagram of a computer system in accordance with the present invention.

Referring to FIG. 1, a computer system 100 suitable for the present invention includes a bus 101 for internal transmission of digital data. A central processing unit (CPU) 102 is coupled to bus 101 and processes digital data information. A plurality of co-processors 103 are also optionally coupled to the bus 101 for additional processing power and speed.

Random access memory (RAM) or main memory 104 is also coupled to bus 101. Main memory 104 suitably stores information and instructions executed by CPU 102. Main memory 104 further stores temporary variables and other intermediate information during execution of instructions by CPU 102, as is well appreciated by those skilled in the art. Read only memory (ROM) or other form of static storage device 106 is also included and coupled to bus 101. ROM 106 preferably stores static information and instructions for CPU 102. Other storage devices 107, such as a hard disk drive, a floppy disk drive, etc., are also suitably included for storing information and instructions and are coupled to bus 101. Further included are hardware graphics accelerator 108, frame/Z-buffer 109, and display controller 110. Although in this representation the hardware graphics accelerstor 108 is shown a separate block it is typically part of the main memory 104. Display controller 110 interfaces computer system 100 to a display device 121. The accelerator maps into the frame buffer 109 a small amount of information. Program like commands are performed in a sequential manner. These commands require a significant amount of processing power.

A cathode ray tube (CRT) as display device 121 suitably displays information to a computer user. Further included for a user are an alphanumeric input device 122, such as a keyboard, and cursor control device 123 such as a mouse, joystick, trackball or touch pad, etc.

In the system 100 above described, a significant amount of interface logic (not shown) is required for proper operation of the computer system. This interface logic is typically required to adequately arbitrate operations between different processors and/or processes. The present advantage takes inherent power of this interface logic's circuit. It also takes to advantage the fact that in a multiprocessing environment, the main memory 104 is very large to accommodate the various activities in the processing system.

In a conventional graphics rendering system which is utilized in the system, much of the complexity is required due to the sequentiality of the ordering of commands for acceleration. This is due to the fact that multiple processors or even in a preemptive processing environment require arbitration to ensure that no interference takes place between the various processes. In addition, this type of system requires significant software overhead, for the above-mentioned reasons.

Figure 2:
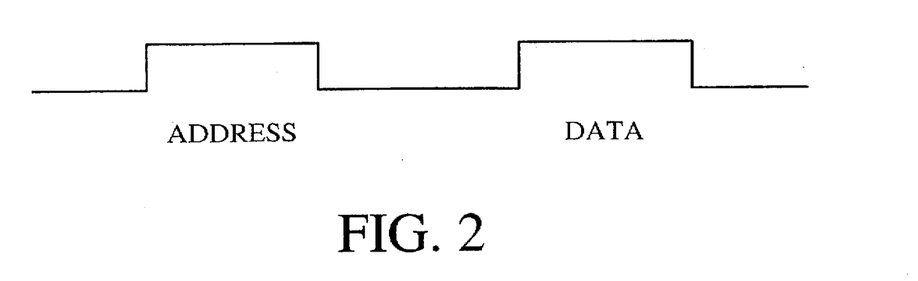
FIG. 2 is a diagrammatic representation of the address signal and the data signal in accordance with the present invention.

The present invention takes to advantage the features of a typical multiprocessor or multiprocessing system and provides for improved acceleration of graphics to a display. One of the key features of a multiprocessor computer system is that a processing unit will provide information to main memory through two separate signals, the address signal 202 and the data signal 204, as shown in FIG. 2. The address and data signals 202 and 204 are always sent in this sequence. When providing information to the memory, typically the address information is encoded to the address signal, and value information is encoded into the data signal. Accordingly, the frame buffer 114 (FIG. 1) when conventionally rendering a graphics image is set up so that a location and data can be obtained in a sequential and systematic manner within the main memory.

Accordingly, complex program codes and the like are required to ensure that the arbitration between the various processors or in a preemptive system the different processes, do not interfere with each other. Applicants have utilized the fact that as multiprocessing and multiprocessor systems become more prevalent a larger addressable space within memory potential is possible. For example, in larger processors, (i.e., 64 bit processors) the addressable space can be represented by larger numbers of bits (i.e., 64 bits). In so doing, these bits are typically utilized as memory locations for a disk, printer or other peripheral devices. The present invention rather than utilizing this addressable space as memory locations utilizes it simply as an area to place data which has some logical relationship to each other.

Accordingly, by using a portion of memory as a large addressable space when rendering graphic images and even will allow for encoding first and second value information signals (data and address) rather than merely encoding location information into the address signal and encoding the data into the data signal the rendering of a graphics image is faster than in conventional systems. Since the information encoded is merely data bits rather than a particular location or value then the information can be stored in one atomic operation. Accordingly, the present invention provides encoding a first value information into the address signal where heretofore address information was viewed solely for providing location.

Figure 3:
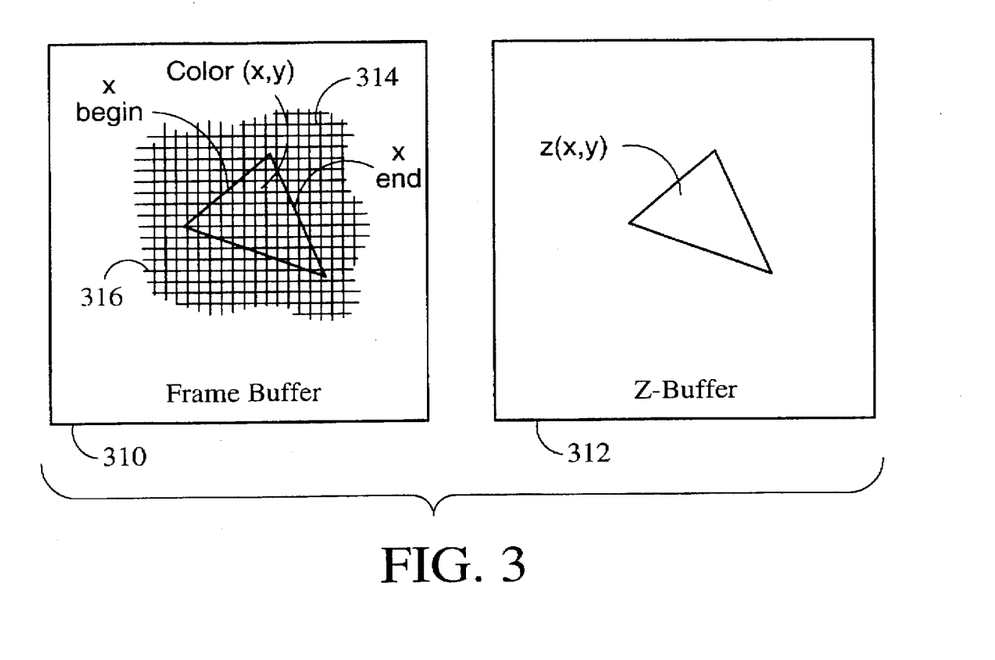
FIG. 3 represents a block diagram of a frame buffer and a z-buffer in accordance with the present invention.

To more particularly understand the present invention refer now to FIG. 3. FIG. 3 is a block diagram of a frame buffer 310 and a z-buffer 312. The frame buffer 310 is an array of (x, y) coordinates 314 corresponding to pixels on a display. The frame buffer 310 is shown here storing the image of a triangle. At each (x, y) coordinate 314 in the frame buffer 310, the intensity or color of the point is stored. At each corresponding (x, y) location in the z-buffer, the depth z (x, y) is stored. In a conventional z-buffer process, each horizontal row of a polygon is known as a span 316 scan-line and is processed separately. Each span 316 of scan-line has a beginning x-coordinate, called xbegin, and an ending x-coordinate, called xend. The color at each point is typically represented by a combination of three values, a red value, a green value and a blue value.

Figure 4:
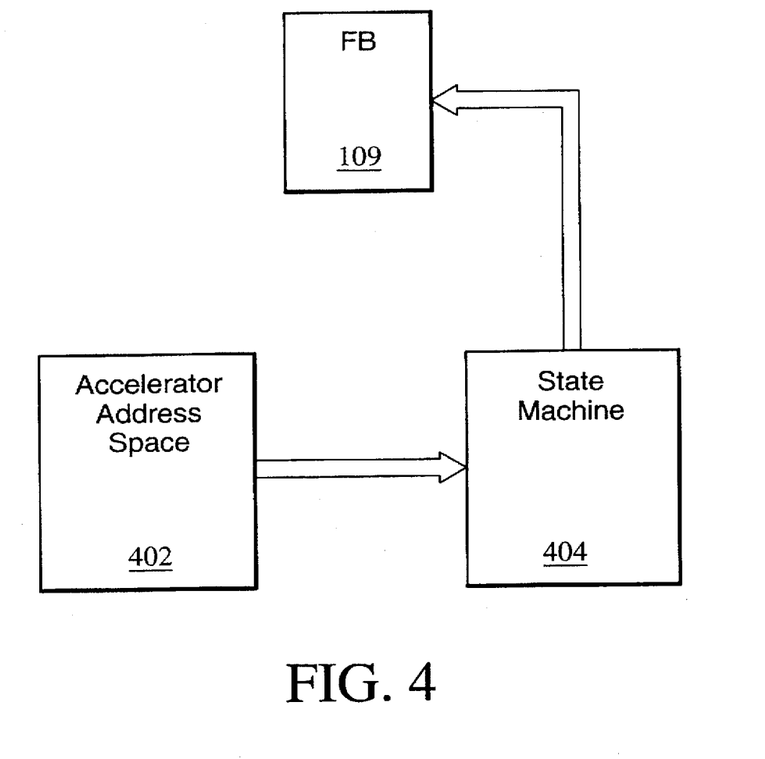
FIG. 4 represents an accelerator address space under control of the operating system in accordance with the present invention.

A system and method in accordance with the present invention takes each span line and encodes that information into an addressable space of the memory 110 (FIG. 1). Accordingly, referring now to FIG. 4, an accelerator address space 402 of the computer system encodes value, row and location information of a span of a scan-line and provides that information to the frame buffer 109 via a state machine 404. As has been before mentioned, this accelerator address space 402 fills out the frame buffer 109 with the span lines via the state machine 404 in a conventional manner to provide the graphics rendering.

Figure 5:
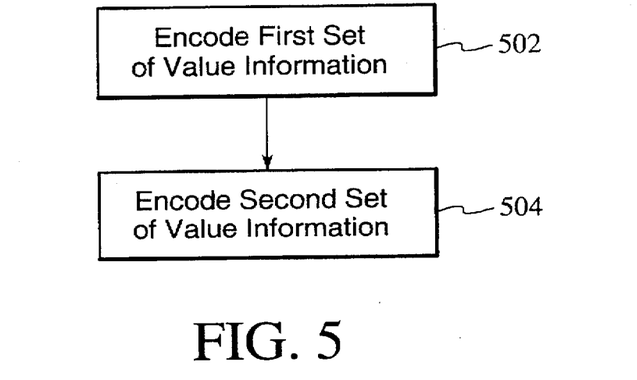
FIG. 5 is a simple flowchart of the operation of the present invention.

To more clearly show the operation of the present invention, refer now to FIG. 5, which is a simple flowchart of the operation of the present invention. In this flowchart as is seen, a first set of data is encoded to the address signal provided by the CPU via step 502 and a second set of data is encoded to the data signal provided by the CPU via step 504. In so doing, the graphics rendering can be provided much more quickly than in conventional systems because the address signal can be utilized to encode more than location information. In fact, since a portion of the main memory is utilized as accelerator addressable space, the location of the information for rendering the image within the memory is unimportant. The important issue is that the various pieces of information for rendering the image are related in a logical manner.

Figure 6:
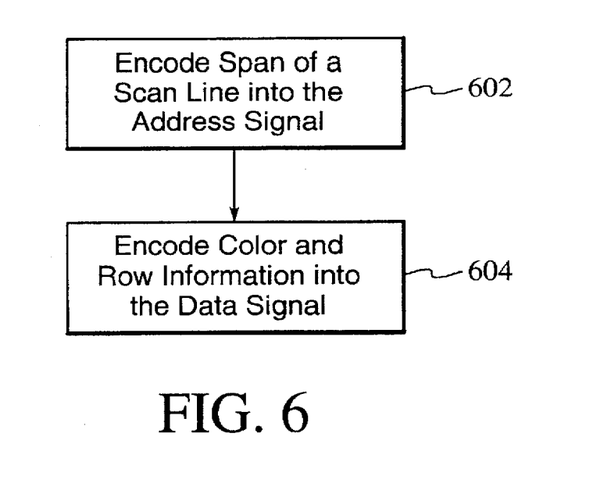
FIG. 6 is a flowchart of the operation of a first embodiment in which a span of a scan-line is encoded in the address signal and then the value information of the scan-line is encoded in accordance with the present invention.

To more specifically show one embodiment of the present invention, refer now to FIG. 6 which is a flowchart in which first a span of a scan-line is encoded via step 602 and then the value information of the scan-line is encoded via step 604.

Figure 7:
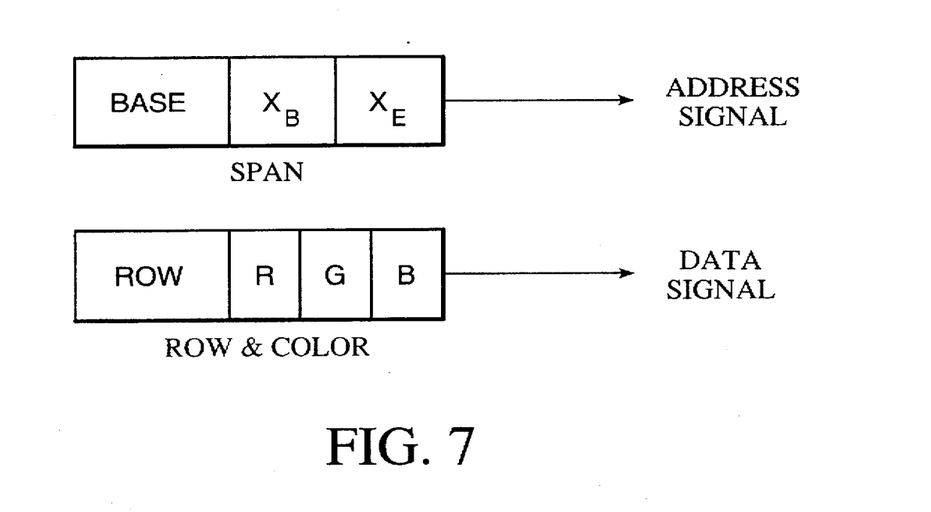
FIG. 7 represents the encoding of a particular scan-line in accordance with FIG. 6.

Referring now to FIG. 7, to encode the span, $x_b$ (which is the starting point of the span) is provided and $x_e$ (which is the end part of the span) is provided plus a BASE value (which typically is for example the starting point of the scan-line). This information is used together to provide the span shown in FIG. 3 of a particular scan-line within the triangle. Next color and the row information of the span is encoded in the data signal.

Figure 8:
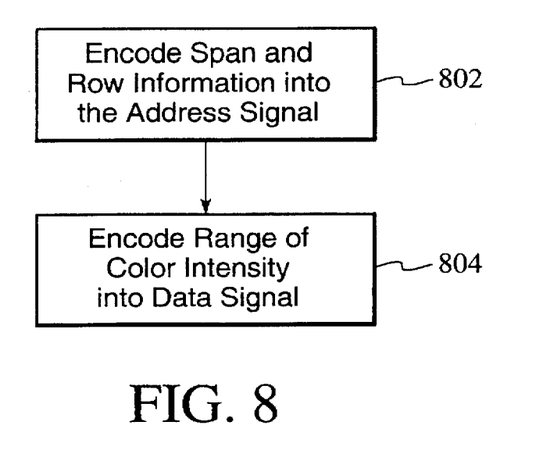
FIG. 8 is a flowchart of the operation of a second embodiment in which intensity value can be encoded into the data signal as well as the changes in intensity value from beginning red, green, blue (RGB) values to ending RGB values.

In another embodiment shown in FIG. 8, span and row information is encoded into the address signal via step 802. The range of color can be encoded in the data signal via step 804. The color and also the intensity value for each color or mixture of colors in intensity value can be encoded into the data signal.

Figure 9:
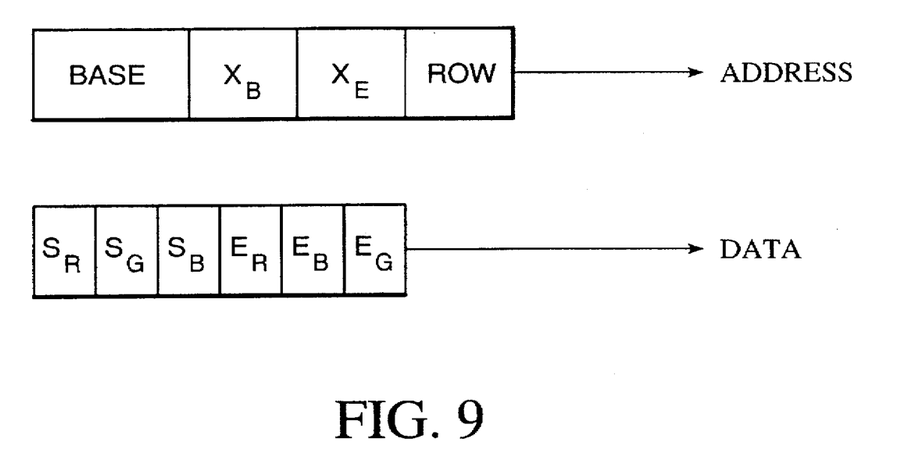
FIG. 9 represents the encoding of a particular scan-line in accordance with FIG. 8.

In this embodiment, referring now to FIG. 9, the row and span line is encoded in the address signal. The color information is encoded in two forms, starting red ($S_R$), starting green ($S_G$) and starting blue ($S_B$) and also as ending red ($E_R$), ending blue ($E_B$) and ending green ($E_G$). As has been mentioned, encoding these values in a 64 bit processor is realizable and has significant advantages when rendering graphics images on the computer system.

Accordingly, in a method and system in accordance with this invention more information can be encoded and therefore a more efficient rendering of the graphics image can be provided because the numbers are not required to be at a specific location in memory. Accordingly, the requirement for sequential codes and the like and the need for additional software overhead is substantially eliminated.

Although the present invention has been described in accordance with the embodiments shown, one of ordinary skill in the art will recognize that there could be variations to the embodiment and those variations would be within the spirit and scope of the present invention. For example, although the present invention has been described as a control process stored in memory, control logic devices suitably designed to perform the various functions as described herein are within the spirit and scope of the present invention. Further, although the present invention has been described in terms of encoding information in a particular order, this encoding could suitably be performed in an alternate order, as well. Accordingly, many modifications may be made by one of ordinary skill without departing from the spirit and scope of the present invention, the scope of which is defined by the following claims.

We claim:

1. A method for accelerating graphics images, the graphics images including a plurality of scan lines in a computer system, the computer including a central processing unit (CPU) and a memory, the method comprising the steps of:
   a) encoding a first value information of a scan line into an address signal from the CPU; and
   b) encoding a second value information of the scan line into the data signal from the CPU.

2. The method of claim 1 in which the first value information comprises a span of the scan line.

3. The method of claim 2 in which the second value information comprises row and color information of the scan line.

4. The method of claim 1 in which the first value information comprises span and row information of the scan line.

5. The method of claim 4 in which the second value information comprises a range of color intensity of the scan line.

6. The method of claim 5 in which the range of color intensity comprises starting red to ending red, starting green to ending green, and starting blue to ending blue intensity information.

7. The method of claim 6 in which the central processing unit comprises a 64 bit processor.

8. A method for accelerating graphics images in a computer system, the graphics images including a plurality of scan lines in a computer system, the computer including a central processing unit (CPU) and a memory, the memory further including a frame buffer therewithin, the method comprising the steps of:
   (a) creating an addressable space in the memory;
   (b) encoding information into that addressable space based upon an address signal and data signal from the CPU; and
   (c) filling the frame buffer with the information from addressable space to provide for the rendering of graphic images.

9. The method of claim 8 in which the encoding step (b) comprises:
   (b1) encoding a first value information of a scan-line into an address signal from the CPU, and
   (b2) encoding a second value information of a scan-line line into a data signal from the CPU.

10. The method of claim 9 in which the first value information comprises a span of the scan line.

11. The method of claim 10, in which the second value information comprises row and color information of the scan line.

12. The method of claim 9 in which the first value information comprises span and row information of the scan line.

13. The method of claim 12 in which the second value information comprises a range of color intensity of the scan line.

14. The method of claim 13 in which the range of color intensity comprises starting red to ending red, starting green to ending green, and starting blue to ending blue intensity information.

15. The method of claim 14 in which the central processing unit comprises a 64 bit processor.

16. A system for accelerating graphics images, the graphics images including a plurality of scan lines in a computer system, the computer including a central processing unit (CPU) and a memory, the memory further including a frame buffer therewithin, the method comprising the steps of:
   accelerator means for creating an addressable space in the memory;
   means responsive to the accelerator means for encoding information into that addressable space based upon an address signal and data signal from the CPU; and
   means responsive to the encoding means for filling the frame buffer with the information from addressable space to provide for the rendering of graphic images.

17. The system of claim 16 in which the encoding means comprises:
   means for encoding a first value information of a scan-line into an address signal from the CPU, and
   means for encoding a second value information of a scan-line into a data signal from the CPU.

18. The system of claim 17 in which the first value information comprises a span of the scan line.

19. The system of claim 18 in which the second value information comprises row and color information of the scan line.

20. The system of claim 17 in which the first value information comprises span and row information of the scan line.

21. The system of claim 20 in which the second value information comprises a range of color intensity of the scan line.

22. The system of claim 21 in which the range of color intensity comprises starting red to ending red, starting green to ending green, and starting blue to ending blue intensity information.

23. The system of claim 22 in which the central processing unit comprises a 64 bit processor.

24. A computer readable medium containing program instructions for accelerating graphics images, the graphics images including a plurality of scan lines in a computer system, the computer including a central processing unit (CPU) and a memory, the program instructions comprising:
   a) encoding a first value information of a scan line into an address signal from the CPU; and b) encoding a second value information of the scan line into the data signal from the CPU.

25. The computer readable medium of claim 24 in which the first value information comprises a span of the scan line.

26. The computer readable medium of claim 25 in which the second value information comprises row and color information of the scan line.

27. The computer readable medium of claim 24 in which the first value information comprises span and row information of the scan line.

28. The computer readable medium of claim 27 in which the second value information comprises a range of color intensity of the scan line.

29. The computer readable medium of claim 28 in which the range of color intensity comprises starting red to ending red, starting green to ending green, and starting blue to ending blue intensity information.

30. The computer readable medium of claim 29 in which the central processing unit comprises a 64 bit processor.

31. A computer readable medium containing program instructions for accelerating graphics images in a computer system, the graphics images including a plurality of scan lines in a computer system, the computer including a central processing unit (CPU) and a memory, the memory further including a frame buffer therewithin, the program instructions comprising:

(a) creating an addressable space in the memory;

(b) encoding information into that addressable space based upon an address signal and data signal from the CPU; and (c) filling the frame buffer with the information from addressable space to provide for the rendering of graphic images.

32. The computer readable medium of claim 21 in which the encoding instruction (b) comprises:

(b1) encoding a first value information of a scan-line into an address signal from the CPU, and (b2) encoding a second value information of a scan-line into a data signal from the CPU.

33. The computer readable medium of claim 32 in which the first value information comprises a span of the scan line.

34. The computer readable medium of claim 33 in which the second value information comprises row and color information of the scan line.

35. The computer readable medium of claim 32 in which the first value information comprises span and row information of the scan line.

36. The computer readable medium of claim 35 in which the second value information comprises a range of color intensity of the scan line.

37. The computer readable medium of claim 36 in which the range of color intensity comprises starting red to ending red, starting green to ending green, and starting blue to ending blue intensity information.

38. The computer readable medium of claim 37 in which the central processing unit comprises a 64 bit processor.

* * * * *

UNITED STATES PATENT AND TRADEMARK OFFICE
CERTIFICATE OF CORRECTION

PATENT NO. : 5,727,190
DATED : March 10, 1998
INVENTOR(S) : Derby, et al.

It is certified that error appears in the above-identified patent and that said Letters Patent is hereby corrected as shown below:

In Claim 32, at column 8, line 4, delete "claim 21" and insert --claim 31--.

Signed and Sealed this

Twenty-first Day of September, 1999

Attest:

Q. TODD DICKINSON

*Attesting Officer*       *Acting Commissioner of Patents and Trademarks*